United States Patent
Bastgen et al.

[11] Patent Number: 5,227,073
[45] Date of Patent: Jul. 13, 1993

[54] METHOD OF DEWATERING SUSPENSIONS OR THE LIKE SLURRY-LIKE MIXTURES

[75] Inventors: Wendel Bastgen, Betzdorf/Sieg, Fed. Rep. of Germany; Otto Klein, deceased, late of Freudenberg, Fed. Rep. of Germany, by Mrs. Hannelore Klein

[73] Assignee: Alb. Klein GmbH & Co. KG, Niederfischbach, Fed. Rep. of Germany

[21] Appl. No.: 775,764

[22] Filed: Oct. 15, 1991

[30] Foreign Application Priority Data

Oct. 18, 1990 [DE] Fed. Rep. of Germany ....... 4033022
May 17, 1991 [DE] Fed. Rep. of Germany ....... 4116146

[51] Int. Cl.$^5$ ............................................. C02F 11/14
[52] U.S. Cl. .................................. 210/710; 210/711; 210/713; 210/727; 210/771; 210/778
[58] Field of Search ............. 210/609, 710, 711, 713, 210/737, 768, 770, 771, 778, 728, 726, 727

[56] References Cited

U.S. PATENT DOCUMENTS

| | | | |
|---|---|---|---|
| 2,072,154 | 3/1937 | Butterfield | 210/770 |
| 4,192,743 | 3/1980 | Bastgen et al. | 210/770 |
| 4,587,022 | 5/1986 | Shimizu et al. | 210/710 |
| 4,961,862 | 10/1990 | Janecek | 210/778 |
| 5,075,012 | 12/1991 | Busse | 210/778 |

FOREIGN PATENT DOCUMENTS

| | | | |
|---|---|---|---|
| 1960365 | 6/1971 | Fed. Rep. of Germany | 210/778 |
| 2261158 | 9/1977 | Fed. Rep. of Germany | 210/778 |

*Primary Examiner*—Peter Hruskoci
*Attorney, Agent, or Firm*—Bachman & LaPointe

[57] ABSTRACT

In a method of dewatering suspensions or the like slurry-like mixtures, in particular waste water slurries, fed to a belt filter press formed by filter belts, with the waste water slurry, is a crumbly dry substance which has been produced by drying from the solids discharge of the belt filter press.

7 Claims, 1 Drawing Sheet

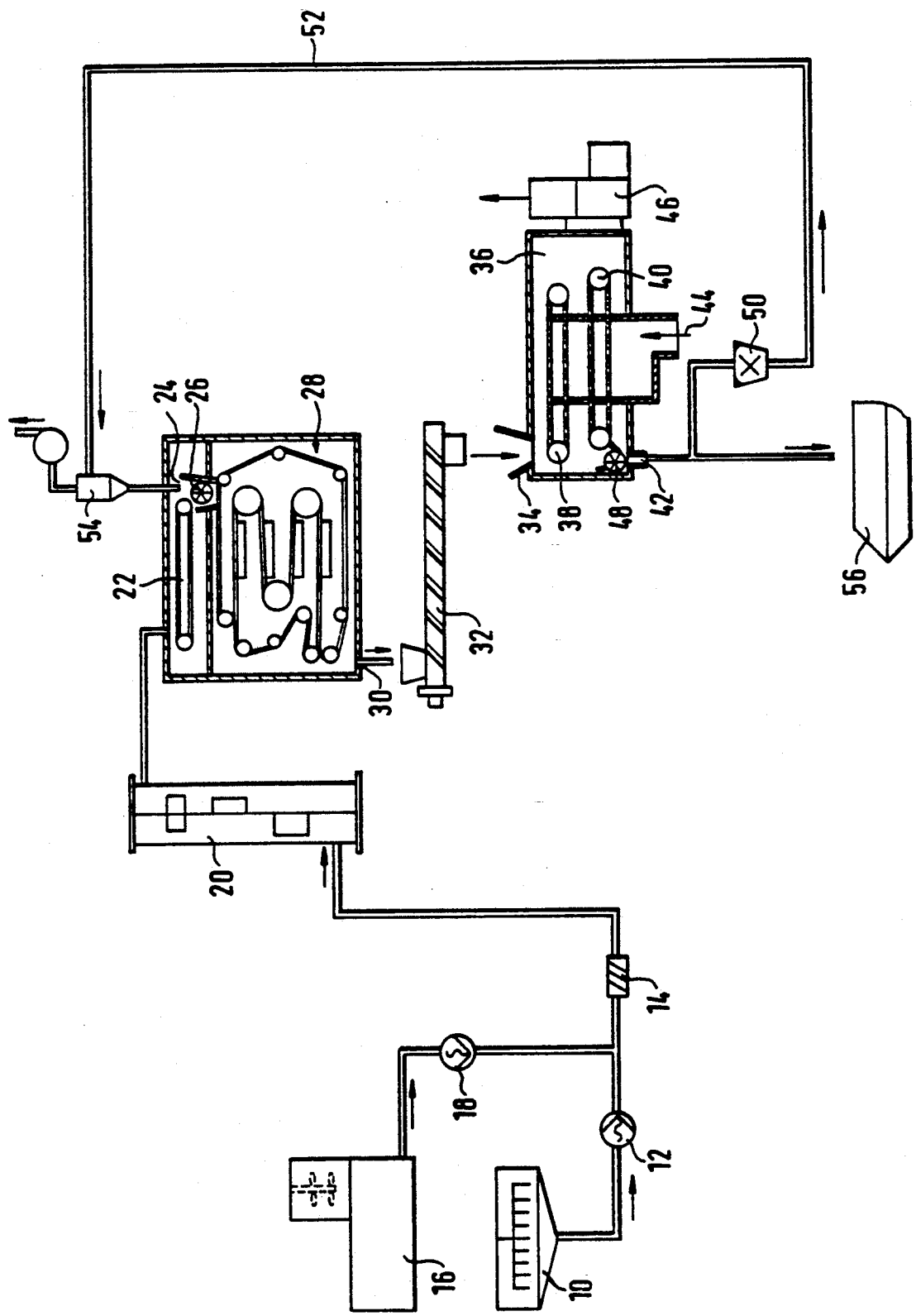

METHOD OF DEWATERING SUSPENSIONS OR THE LIKE SLURRY-LIKE MIXTURES

BACKGROUND OF THE INVENTION

The invention relates to a method of dewatering suspensions or the like slurry-like mixtures, in particular settlement slurries in a high pressure pressing zone formed by filter belts, after preliminary dewatering.

Screen belt presses are used in many cases for the dewatering of settlement slurries. Frequently however such presses do not achieve the solids contents as are required by the dump or disposal site management authorities, in regard to the depositing of the press cakes. In order to achieve a condition of dumpability therefore, use is increasingly made for slurry dewatering purposes of high pressure belt presses as are described for example in the present applicants' German patent specification No 2 720 178. In order to make the best possible use of the capacity of the relatively expensive high pressure belt presses, it is today part of the state of the art to dispose upstream of the actual high pressure portion a preliminary dewatering stage in the form of a strainer belt or a rotating screening drum; that arrangement provides that a large amount of filtrate is already separated off in a simple and inexpensive manner and the high pressure press is then only charged with the remaining, concentrated residue of the thin slurry.

High pressure belt presses achieve a solids content in the press cake which is about 5 to 10% higher than in the case of a dewatering operation on normal screen belt presses. However a prerequisite in that respect is that the settlement slurry to be dewatered is of adequate dewatering quality so that the pressing pressure which can be produced in high pressure belt presses can be applied at all. So that high pressure belt presses can also be used successfully in relation to heavy slurries, as for example in the case of biological overflow slurry which has only a very low degree of pressing stability, and already begins to flow under a low pressure loading as a result of its thixotropic and structure-viscose properties and is pressed through the meshes of the filter cloth, the conventional practice is for sawdust or peat litter to be mixed in with thin slurry of that kind, as structure-forming substances. The slurry is made more pressure-stable by virtue of that additive and can be dewatered by means of high pressing pressures to a dumpable consistency. The disadvantages of that method are that on the one hand large amounts of suitable additive substances must be obtained, transported to the settlement installation and stored there, with consequential effects on cost, and that on the other hand the amount of waste matter to be dumped is considerably increased by the additive substances. The addition of 10 kg of sawdust/m$^3$ of thin slurry with 3% solid content increases the disposal amount by 33%.

It is also known for the amount of press cake to be reduced by a subsequently effected thermal drying operation, using direct or indirect heating. Although such driers produce a very substantial quantitative reduction, they do however represent an expensive capital investment factor and they involve very high operating costs. In addition, with the temperatures which occur in the material to be dried, a number of harmful substances which cause severe environmental pollution and extremely foul-smelling sulphur and albumin compounds are expelled, which must be separated out of the vapours or condensates from the driers, by means of highly expensive procedures. Those substances are generally recycled to the settlement installation and seriously encumber same with their high biological and chemical oxygen demand.

In consideration of that state of the art, the inventor set himself the aim of substantially reducing the residual amount which remains in settlement slurry dewatering, in an inexpensive and environment-friendly manner, while avoiding the above-described shortcomings.

SUMMARY OF THE INVENTION

That object is attained in that the settlement slurry is mixed upstream of the high pressure treatment with finely crushed dry material obtained by drying from the press cake of the high pressure pressing zone. In that connection the finely crushed dry material is preferably added between the preliminary dewatering step and the high pressure pressing zone, but it may also already be added to the slurry in a flocculation operation which precedes the preliminary dewatering operation, and possibly between the flocculation zone and the preliminary dewatering step.

It has been found particularly advantageous for crushed dry substance to be added to the settlement slurry which has been subjected to preliminary dewatering, upstream of the high pressure pressing zone, in a ratio of 1:0.5 to 1:10 with respect to the solid content in the slurry, in particular from 1:1 to 1:5.

In accordance with the teaching of the invention therefore the settlement slurry, prior to or after preliminary dewatering thereof, is mixed with dried and finely crushed press cake, mechanically substantially dewatered with high pressure belt presses, granulated, and dried in a cold air flow. In that connection, depending on the purpose of use, either only the amount of press cake required for producing the recycle material can be dried, and the remaining press cake is dumped as such or used as fertiliser in agriculture.

Likewise however it is also possible to provide for drying of the entire press cake produced, and then a partial flow is branched off from the dry material for structure-forming conditioning of the thin slurry which has been subjected to preliminary dewatering, the residual dry material can be dumped, burnt or used in agriculture.

In order to achieve a high degree of efficiency in the cold air drying operation, in accordance with the invention preliminary granulation of the press cake to particle sizes of from 0.3 to 0.6 mm is required. Another prerequisite is that that granulate material does not stick together. Those conditions are only satisfied by press cakes which, depending on the kind of slurry, have been statically dewatered with high pressure belt presses to a content of 35 to 50% dry substance. Such press cakes can be easily broken down to the desired grain size by means of simple paddle shafts.

In accordance with the invention the above-indicated settlement slurry granulate material is uniformly distributed in layer thicknesses of between 1 and 20 cm over a horizontally circulating screen belt through which the air flows at ambient temperature. When it passes through the moist layer of granulate material, the air becomes saturated with moisture and in so doing dries the granulate material. The aerobic bacterial contained in the slurry generate an increased amount of activity, under the conditions which are very favourable to them, whereby to a certain extent an increase in temperature in the granulate material accelerates the drying effect while at the same time there is additional aerobic stabilisation. However that biogenic increase in temperature remains far below the temperature at which smell emission occurs or noxious substances are given off, so that the disadvantages which are known in relation to thermal drying are avoided.

A particularly advantageous apparatus for carrying out that method is distinguished in that at least one drier is disposed downstream of the discharge of a high pressure belt press upstream and/or downstream of a crushing member, wherein the discharge of the drier or the crushing member disposed downstream thereof—preferably a paddle screw—is connected to a feed device of the filter press so that dry material which is obtained from the filter cake and which is crumbled in a simple manner is returned to the settlement slurry and with same passes through the pressing zones, increasing the filter efficiency.

It has also been found advantageous for the drier used to be a cold air drier in which there is at least one screen belt for receiving the conveyed material to be dried.

With a suitable air through-flow rate, in the cold drying operation, the drying potential of ambient air is generally sufficient to achieve a solids content of at least 80% in the dry material. It is only under highly disadvantageous weather conditions (for example relative air humidity of over 80% at temperatures of below 5° C.) that there is a need for slight heating of the drying air by 5° to 10° C. by switching on a suitable heating source (gas or oil burner or electrical heating system).

With average climatic conditions, there is no need for additional heating, and the entire evaporation work is produced by the drying potential of the ambient air, which is available at no cost, and the only energy expenditure is the electrical power that must be used for driving the drier and the low pressure fan. It is about 3 kWh/m$^3$ thin slurry or about 100 kWh/t dry substance, when dewatering and cold drying a 3% settlement slurry to an 80% residual dry content (corresponding to a residual amount of 37.5 kg of dry granulate material/m$^3$ thin slurry as a dumping quantity). Thermal drying installations with direct or indirect heating consume from 10 to 40 times the amount of energy, under conditions which are otherwise the same.

BRIEF DESCRIPTION OF THE DRAWINGS

Further advantages, features and details of the invention will be apparent from the following description of preferred embodiments and with reference to the drawing in which the single FIGURE is a diagrammatic view of a method for a slurry dewatering operation.

DETAILED DESCRIPTION

Thin slurry to be dewatered, coming from a settlement installation diagrammatically indicated at 10, is conveyed into a controllable mixer 14 by a steplessly adjustable eccentric screw pump as a slurry metering pump 12. In the mixer 14 the slurry is intensively mixed with a dilute polyelectrolyte solution which is made in a flocculating agent preparation station 16 and metered into the mixer 14 by a flocculating agent metering pump 18. The flocculated slurry is conveyed into a reaction mixer 20 for optimisation of the flocculation effect and from there passes on to a strainer belt 22 for the preliminary dewatering operation.

Disposed in a feed hopper 24, which is arranged downstream of the strainer belt 22, of a high pressure belt press 28 is a mixing device 26 in the form of a cell-type wheel in which the slurry which has been subjected to preliminary dewatering is mixed with dry material which is recycled in a dry material line 52 of a dry material container indicated at 46. The feed hopper serves as a buffer container for the high pressure pressing operation which in the selected embodiment operates in a cyclic fashion. In this case the lowest point of the feed hopper 24 comprises the upper run of an upper filter belt of the high pressure belt press 28 which moves forwardly in the cyclic procedure with adjustable residence times approximately by a respective pressing chamber length a to a first pressing station which is in the form of a variable wedge zone between an upper filter belt and a lower filter belt, which permits a precisely adjustable layer thickness at its discharge end and which in addition expels further liquid.

The layer of slurry which has been subjected to preliminary dewatering is conveyed between the two filter belts in the cyclic procedure into a first pressing chamber in which the slurry is pressed between the two filter belts by perforated pressure plates applied at both sides thereof, acting as pressure members, using a steplessly adjustable pressure. Arranged downstream of the pressing chamber are further pressing chambers through which the filter belts are passed in a meander-like configuration around direction-changing rollers.

In that way the mixture is dewatered in the cyclic procedure in the high pressure belt press 28 to form a plate-shaped press cake which issues from the high pressure belt press 28 at 30 and which is conveyed by a paddle screw 32, with simultaneous granulation thereof, into a feed shaft 34 of a cold air drier 36. The drier is shown with two stages comprising two endless horizontal screen belts 38, 40. On the latter the granulate material is distributed in the form of a uniform layer and moves from left to right in the upper stage 38, is thrown off at the end of the upper stage 38 on to the stage 40 therebeneath and is transported from right to left to a discharge 42.

During the entire transportation movement in the first and second stages 38 and 40, cold air flows through the layer of granulate material. The cold air passes into the cold air drier 36 at the bottom at 44 and is sucked away by a fan 46 at the end. After passing through the cold air drier 36, the granulate material which is dried by an evaporation effect is discharged from the cold air drier 36 by a cell-type wheel valve arrangement 48. A partial flow corresponding to the recycle quantity is passed by way of a mill 50 where it is crushed to the required grain size, and conveyed by way of the above-mentioned dry material line 52 into a supply container 54 upstream of the feed hopper 24. The remaining granulate material passes into a container 56 to be transported away.

If the press cake is wanted as an end product, the division step is already effected at the discharge 30 from the high pressure belt press 28. The quantity which is required for producing the dry material is granulated in the paddle screw 32, dried in the cold air drier 36, then crushed in the mill 50 and passes in the form of dry fine material into the supply container 54; the remaining press cake is discharged directly into the container 56.

In an embodiment of the method which is not shown in the drawing, the dry material line 52 is returned to the mixing pot 20, that is to say the dry material is already added to the slurry at that location.

It is to be understood that the invention is not limited to the illustrations described and shown herein, which are deemed to be merely illustrative of the best mode of carrying out the invention, and which are susceptible of modification of form, size, arrangement of parts and details of operation. The invention rather is intended to encompass all such modifications which are within its spirit and scope as defined by the claims.

We claim:

1. A method for dewatering suspensions comprising: flocculating said suspensions with a flocculating agent in a flocculating zone; passing said suspensions through a preliminary dewatering zone so as to obtain a partially dewatered slurry; subjecting said partially dewatered slurry to high pressure pressing in a pressing zone to obtain a dewatered press cake having a content of about 35 to 50% dry substance; granulating said dewatered press cake to particle sizes from 0.3 to 0.6 mm; drying the granulated press cake; crushing at least a portion of the dry granulated press cake to obtain a crushed product having a particle size of less than or equal to 3.0 mm; and admixing said crushed product with said suspensions prior to high pressure pressing in said pressing zone in a ratio with respect to solids in said suspensions of between 1:0.5 to 1:10, so as to improve the stability of the press cake.

2. A method according to claim 1 including admixing said crushed product with said suspensions in said flocculation zone.

3. A method according to claim 1 including admixing said crushed product with said suspensions downstream of said flocculation zone.

4. A method according to claim 1 including admixing said crushed product with said suspensions downstream of said preliminary dewatering zone.

5. A method according to claim 1 including continuously admixing said crushed product with said suspensions.

6. A method according to claim 1 wherein the particle size of the crushed product is between 0.1 to 1.5 mm.

7. A method according to claim 1 wherein the ratio of said crushed product to solid content in said suspensions is between 1:1 to 1:5.

* * * * *